Jan. 30, 1951        F. G. VARABEAU        2,539,711

TIRE AND WHEEL ASSEMBLY LIFTING DEVICE

Filed July 21, 1949

Inventor:
Frederick G. Varabeau
By
his Atty's

Patented Jan. 30, 1951

2,539,711

UNITED STATES PATENT OFFICE 2,539,711

TIRE AND WHEEL ASSEMBLY LIFTING DEVICE

Frederick G. Varabeau, Melfort, Saskatchewan, Canada

Application July 21, 1949, Serial No. 106,059

1 Claim. (Cl. 254—131)

My invention relates to new and useful improvements in tire and wheel assembly lifting devices, an object of my invention being to provide a device of the character herewithin described which facilitates the positioning of the tire and wheel assembly prior to mounting same upon the wheel studs.

A further object of my invention is to provide a device of the character herewithin described which can be actuated readily by one person and which furthermore includes an adjusting bracket in order to maintain the height of the cradle at the correct position in order that the wheel and tire assembly may be mounted upon the studs.

Another object of my invention is to provide a device of the character herewithin described which includes a stabilizer in order to facilitate the positioning of the device and to prevent rotation thereof.

A still further object of my invention is to provide a device of the character herewithin described which is adaptable for use with tires of varying cross-sections.

Another object of my invention is to provide a device of the character herewithin described which is economical in manufacture, simple in operation, and otherwise well suited for the purpose for which it is designed.

With the foregoing objects in view and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
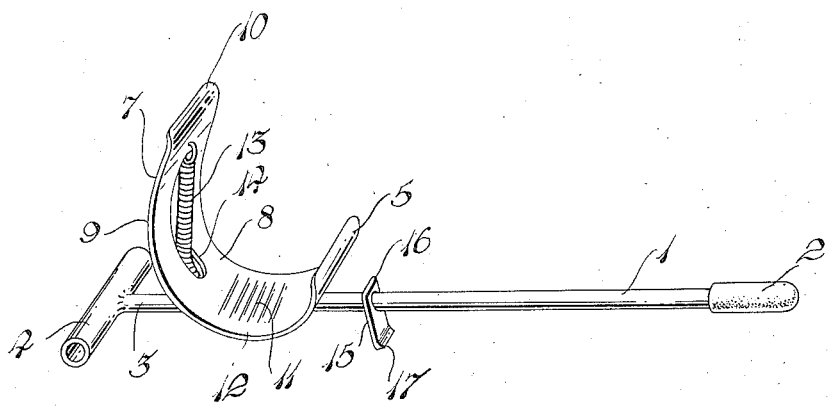
Figure 1 is a perspective view of the device in the raised position.
Figure 2:
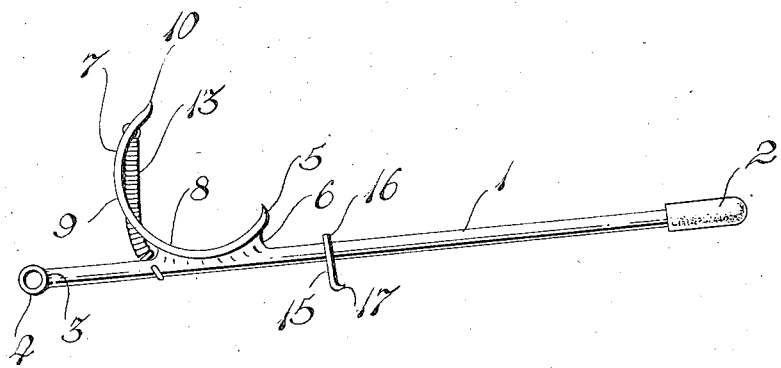
Figure 2 is a side elevation of my device.

When changing a tire and wheel of a vehicle, considerable difficulty is experienced in positioning the apertures within the wheel flange in alignment with the studs upon the hub, particularly with the majority of present day vehicles, the wheels and tires of which are relatively heavy.

The present invention has been designed to support the wheel and tire assembly at the required height above the ground, whereupon the studs and apertures may be aligned and the wheel mounted thereon with the minimum of effort.

Proceeding now to describe my invention in detail it will be seen upon reference to the accompanying drawing that I have provided an elongated cylindrical lever-bar 1 having a handle 2 secured thereto at one end thereof. The handle 2 may take the form of an enlarged portion screwed or welded to the lever-bar 1 or may be in the form of a rubber grip in order to provide an efficient handhold when operating the device.

The opposite end 3 of the lever-bar is provided with stabilizing means 4 in order to prevent rotation of the bar when in use. In this embodiment the stabilizer takes the form of a tubular member 4 welded to the end 3 of the lever-bar 1 at right angles to the longitudinal axis thereof, this stabilizer engaging with the ground as will be clearly apparent from the accompanying drawing. If desired rollers or wheels (not illustrated) may be attached to the stabilizer 4 in order to facilitate the positioning of the device as will hereinafter be described.

A tire and wheel assembly cradle collectively designated 5 is secured along the length of the lever-bar 1 as by welding 6 and, in this embodiment, takes the form of a semi-circular curved plate 7, the interior surface 8 of which is formed to complement the cross-section of contour of a conventional tire. What I define as the rear wall 9 of the cradle continues upwardly from the lever-bar 1 and terminates with the upper edge at 10 which curves in the opposite direction to provide a lead-in for the associated tire.

In order to assist in the gripping of the tire when embraced transversely by the cradle 5, I have provided serrations or ridges 11 at the base 12 of the plate 7.

In the embodiment illustrated in the accompanying drawing I have designed the cradle 5 so that it is capable of receiving tires of different widths by providing a coil spring 13, which extends between the upper portion 10 of the plate 7 and the lever-bar 1. This spring is located within a vertical slot 14 formed within the rear wall 9 of the plate 7, thereby forming a chord to the semi-circular configuration of the inner wall 8 of the plate 7.

In order to adjust the height of cradle 5 from the ground I have provided an angulated bracket 15 comprising a substantially vertical portion 16 and a foot or ground engaging portion 17. The vertical portion 16 is apertured to enable the bracket to be slidably mounted upon the lever-bar 1 and capable of endwise movement thereon. From the foregoing it will be appreciated that this bracket 15 may be moved lengthwise along the lever-bar 1, the portion 17 engaging with the ground thereby inclining the lever-bar 1 from the horizontal which has the effect of adjusting the height of the cradle 5 from the ground.

In operation, the angulated bracket is moved towards the handle 2 thereby lowering the cradle toward the ground. The tire and wheel assembly is rolled into position within the cradle, the semi-circular plate 7 embracing the tire transversely. In this connection it will be observed that the aforementioned spring 13 grasps the wall of the tire and that the aforementioned serrations 11 assist in preventing undesirable movement when the tire and wheel assembly is in this position. The lifting device is now positioned adjacent the wheel studs whereupon the lever-bar is raised, and at the same time the angulated bracket 15 moves along the bar towards the cradle 5 thereby maintaining the bar in an inclined position. When the cradle has been raised sufficiently to align the studs with the wheel flange apertures, the angulated bracket is adjusted to maintain the assembly in this position, whereupon it may be moved towards the studs until same engage with the apertures.

The lifting device may now be moved from the tire and wheel assembly and the wheel stud now tightened to the desired amount.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

A tire and wheel assembly lifting device comprising in combination a lever bar, a handle secured thereto, stabilizing means on one end of said lever bar and at right angles to the longitudinal axis thereof to prevent rotation of said bar, a tire and wheel assembly cradle secured along the length of said level bar, said cradle having an interior surface which is semi-circular to embrace said tire transversely, said cradle straddling said lever bar, means for adjusting the height of said cradle from the ground, and tire gripping means in said cradle, said tire gripping means including a tension spring extending from said lever bar to a point adjacent the upper forward edge of said cradle, said cradle being slotted to permit the registration of said spring within the semi-circular interior surface thereof.

FREDERICK G. VARABEAU.

REFERENCES CITED

The following references are of record in the file of this patent:

UNITED STATES PATENTS

| Number | Name | Date |
|---|---|---|
| 1,965,260 | Rosenberg | July 3, 1934 |
| 1,981,763 | Usadel | Nov. 20, 1934 |
| 2,207,443 | Schneider | July 9, 1940 |